US012735231B2

(12) United States Patent
Xie et al.

(10) Patent No.: US 12,735,231 B2
(45) Date of Patent: Sep. 15, 2026

(54) TOOL BOX

(71) Applicant: Bo Yu, Yantai City (CN)

(72) Inventors: Yongchao Xie, Yantai (CN); Huijie Li, Yantai (CN); Changlei Fan, Yantai (CN); Bo Yu, Yantai (CN)

(73) Assignee: Bo Yu, Yantai (CN)

( * ) Notice: Subject to any disclaimer, the term of this patent is extended or adjusted under 35 U.S.C. 154(b) by 0 days.

(21) Appl. No.: 19/019,577

(22) Filed: Jan. 14, 2025

(65) Prior Publication Data

US 2026/0138792 A1 May 21, 2026

(30) Foreign Application Priority Data

Nov. 19, 2024 (CN) ......................... 202422819241.0

(51) Int. Cl.
*B65D 43/14* (2006.01)
*B25H 3/00* (2006.01)
*B65D 25/10* (2006.01)
*B65D 25/16* (2006.01)
*B65D 43/22* (2006.01)

(52) U.S. Cl.
CPC ............. *B65D 43/14* (2013.01); *B25H 3/003* (2013.01); *B65D 25/108* (2013.01); *B65D 25/16* (2013.01); *B65D 43/22* (2013.01); *B65D 2313/04* (2013.01); *B65D 2543/00194* (2013.01)

(58) Field of Classification Search
CPC ........ B65D 43/14; B65D 43/20; B65D 43/22; B65D 25/108; B65D 25/16; B65D 2313/04; B65D 2543/00194; B65H 3/003
USPC .................................................. 206/350, 379
See application file for complete search history.

(56) References Cited

U.S. PATENT DOCUMENTS 5,203,469 A * 4/1993 Chang .................... B25H 3/003 220/555
5,732,820 A * 3/1998 Tsai ....................... B65D 43/20 206/443
6,283,291 B1 * 9/2001 Vasudeva ............... B25H 3/003 206/747
6,915,900 B2 * 7/2005 Chen ........................ B25H 3/00 224/904
8,151,986 B1 * 4/2012 Chen ...................... B25H 3/003 220/8
2004/0056035 A1 * 3/2004 Baker ................ B65D 83/0481 220/818
2006/0113304 A1 * 6/2006 Rosenbaum ........... B65D 43/14 220/212
2010/0078437 A1 * 4/2010 Valley, III ............ B65D 43/162 220/555

(Continued)

*Primary Examiner* — Rafael A Ortiz
(74) *Attorney, Agent, or Firm* — The Sun IP Law

(57) ABSTRACT

The present application provides a tool box, including a box body, a cover body and a limiting structure, wherein the cover body is slidably connected to the box body, and can rotate relative to the box body at least at a sliding end of the cover body; the cover body covers the box body when the tool box is in a closed state; and when the tool box is used in an open state, the cover body slides to the sliding end and is turned over to a position where the limiting structure limits the box body and the cover body such that the box body is erected at a certain angle relative to the cover body. The tool box is more conducive to the display of tools in the box body, and can be convenient for users to clearly observe the tools placed in the box body.

17 Claims, 9 Drawing Sheets

(56) References Cited

U.S. PATENT DOCUMENTS

| | | | | |
|---|---|---|---|---|
| 2018/0305092 | A1* | 10/2018 | Lucas, Jr. | B65D 50/046 |
| 2022/0176541 | A1* | 6/2022 | Lai | B25H 3/003 |

* cited by examiner

TOOL BOX

FIELD OF THE INVENTION

Embodiments of the present application relate to the technical field of tool storage containers, in particular to a tool box.

BACKGROUND OF THE INVENTION

A tool box is a container for storing and carrying various tools, and is commonly used in various occasions such as home repair, gardening, automobile maintenance, electrical appliance repair, and electronic product overhaul.

In the related art, the tool box generally includes a first box body and a second box body, the first box body is pivotally connected with the second box body, a placing position for placing a tool is disposed in each of the first box body and the second box body, when the tool box is in use, a user opens the first box body and the second box body, and then places the first box body and the second box body flat on a table top.

However, there is a problem that it is difficult for users to quickly and clearly observe each tool in the tool box, which makes it inconvenient for users to take the tools when the tool box is placed flat on the table top.

SUMMARY OF THE INVENTION

Embodiments of the present application provide a tool box, which solves the technical problem that it is difficult for users to quickly and clearly observe each tool in the tool box, which makes it inconvenient for users to take the tools when the tool box is placed flat on a table top.

Embodiments of the present application provide the following technical solutions to solve the above technical problems:

An embodiment of the present application provides a tool box, including a box body, a cover body and a limiting structure, wherein the cover body is slidably connected to the box body, and can rotate relative to the box body at least at a sliding end of the cover body;

the cover body covers the box body when the tool box is in a closed state; and when the tool box is used in an open state, the cover body slides to the sliding end and is turned over to a position where the limiting structure limits the box body and the cover body such that the box body is erected at a certain angle relative to the cover body.

Beneficial effects of the embodiments of the present application: the cover body and the box body of the tool box provided by the embodiment of the present application are slidably connected, when the tool box is opened, taking the box body as a reference, the cover body slides to the sliding end with respect to the box body, and is then turned over to the position where the limit structure limits the box body and the cover body, at this time, the box body is erected at a certain angle relative to the cover body, when the tool box is placed on an operating platform, the cover body is placed on the operating platform, the box body is erected at a certain angle relative to the cover body, at this time, the box body faces a user in an erected state, and with respect to the box body placed flat on a table top, the user can more conveniently and clearly observe tools placed inside the box body, i.e., display of the tools inside the box body is facilitated, and taking and placing of the tools is facilitated, so that the user can more conveniently take and place the tools, improving the user experience, and improving the function of the tool box.

In a possible embodiment, both sides of the tool box in a first direction are each provided with a sliding fit mechanism; and each sliding fit mechanism includes a first sliding portion and a second sliding portion, the first sliding portion is disposed on the box body, the second sliding portion is disposed on the cover body, and the first sliding portion and the second sliding portion are slidably connected.

In a possible embodiment, each first sliding portion is a guide plate disposed on the cover body, and the guide plate is provided with a guide sliding groove; and each second sliding portion is a sliding member disposed on the box body, and each sliding member extends into the corresponding guide sliding groove and can slide in the corresponding guide sliding groove.

In a possible embodiment, each guide sliding groove is provided with a first end and a second end in an extending direction thereof, the second end being the sliding end of the cover body;

the limiting structure includes first limiting structures and second limiting structures, each first limiting structure is an edge of the second end of the corresponding guide sliding groove, and each second limiting structure is a first extension extending to a side facing away from the cover body in a region, close to the first end, of the corresponding guide plate; and each first limiting structure abuts against the corresponding sliding member and the second limiting structures abut against the box body when the tool box is used in the open state.

In a possible embodiment, the box body is provided with avoidance openings and avoidance slots which communicate with each other;

each sliding member is disposed on a side wall of the corresponding avoidance opening; and each guide plate is located in the corresponding avoidance opening and the corresponding avoidance slot when the tool box is in the closed state; when the tool box is used in the open state, each guide plate is withdrawn from the corresponding avoidance opening and the corresponding avoidance slot to a position where the first limiting structure abuts against the sliding member, and the cover body is turned over to a position where the second limiting structure abuts against an outer side of a bottom wall of the avoidance slot.

In a possible embodiment, the box body includes a housing and a liner, the liner being mounted within the housing, the liner being provided with a tool placement site where a tool is placed;

the avoidance openings and the avoidance slots are formed between the housing and the liner; and the sliding members are disposed on the liner.

In a possible embodiment, each guide plate extends in the extending direction of the corresponding guide sliding groove to a direction away from the second end of the corresponding guide sliding groove, forming a second extension;

the liner is lined within the housing; and the second extensions extend into the housing when the tool box is in the closed state.

In a possible embodiment, each second extension is provided with a first clamping portion;

a side wall, opposite to each second extension, of the housing is provided with a second clamping portion; and the first clamping portions and the second clamping portions are used for clamping when the tool box is in the closed state.

In a possible embodiment, the tool box further includes first latching structures that latch the box body and the cover body together when the tool box is in the closed state.

In a possible embodiment, at least one of two opposite side walls, close to the first end, of each guide sliding groove is provided with a clamping protrusion protruding into the guide sliding groove, the clamping protrusions being the first latching structures, the clamping protrusions blocking the sliding members from sliding over;

a portion of each guide sliding groove between the corresponding clamping protrusion and an end of the first end of the guide sliding groove is a locking space that accommodates the corresponding sliding member; and when each clamping protrusion abuts against the corresponding sliding member, the box body and/or the cover body are/is pushed with a force, and the sliding member slides over the clamping protrusion and into the corresponding locking space.

In a possible embodiment, the box body is provided with a tool placement site where a tool is placed; and when the tool box is used in the open state, an angle between a side, provided with the tool placement site, of the box body and the cover body is 90-150°.

In a possible embodiment, the box body includes a housing and a liner, the liner is mounted within the housing, the tool placement site is disposed on the liner, and the tool placement site includes a plurality of screwdriver bit placement sites;

the housing is provided with an opening and a first housing wall, the first housing wall being opposite to the opening;

a receiving space is formed between a side, facing the first housing wall, of the liner and the first housing wall; and each screwdriver bit placement site includes an elongated mounting hole disposed in the liner and a clamping structure disposed at an edge of the elongated mounting hole; the screwdriver bit placement site is configured to allow a tail end of a screwdriver bit to be inserted into a first end of the elongated mounting hole, and extend into the receiving space when the screwdriver bit is stored, the screwdriver bit is rotated toward a second end of the elongated mounting hole until the clamping structure clamps the screwdriver bit, and the tail end of the screwdriver bit abuts against an edge of the first end of the elongated mounting hole, the third end and the second end of the elongated mounting hole being both ends of the elongated mounting hole in an extending direction.

In a possible embodiment, each elongated mounting hole extends in a direction in which the box body is erected with respect to the cover body.

In a possible embodiment, each clamping structure includes two clamping blocks, the two clamping blocks being oppositely disposed, one of the clamping blocks being disposed on a first side of the corresponding elongated mounting hole and the other clamping block being disposed on a second side of the elongated mounting hole; and each clamping block is provided with a clamping projection, the two clamping projections are oppositely arranged, and a first contraction space is formed between the two clamping projections, and the screwdriver bit is clamped between the two clamping projections in an interference fit manner.

In a possible embodiment, each screwdriver bit placement site further includes a limit plate for limiting excessive insertion of a tail end of the screwdriver bit, the limit plate being disposed on a side, facing the first housing wall, of the liner and on a side, facing away from the fourth end, of the elongated mounting hole, the limit plate having a clearance distance from an edge of the first end of the elongated mounting hole.

In a possible implementation, each screwdriver bit placement site further includes two stop blocks, the two stop blocks being oppositely disposed, one of the stop blocks being disposed on a first side of the elongated mounting hole and the other stop block being disposed on a second side of the elongated mounting hole; and each stop block is provided with a stop protrusion, the two stop protrusions are oppositely arranged, and a spacing between the two stop protrusions is smaller than a radial dimension of the screwdriver bit; and when the screwdriver bit is clamped at the clamping structure, the two stop protrusions abut against the screwdriver bit and block further rotation of the screwdriver bit.

In a possible embodiment, the first housing wall is provided with an identification layer, a color of the identification layer being different from a color of the liner and a color of the housing.

In a possible embodiment, the cover body is provided with a magnetic sheet placement position, the magnetic sheet placement position is fixedly provided with a magnetic sheet, and the magnetic sheet is located on a front side of the side, provided with the tool placement site, of the box body.

In a possible embodiment, one end of the cover body in a sliding direction is folded to one side to form an arc-shaped curled edge, and an arc-shaped space is formed in the arc-shaped curled edge;

an end of the box body in a sliding direction of the cover body is a curved surface structure; and the curved surface structure moves into the arc-shaped space when the tool box is in the closed state.

In addition to the above technical problems solved by the present application, the technical features constituting the technical solutions and the beneficial effects brought about by the technical features of the technical solutions, other technical problems solved by the tool box provided by the present application, other technical features included in the technical solutions, and the beneficial effects brought about by the technical features will be described in further detail in the detailed description.

BRIEF DESCRIPTION OF DRAWINGS

The drawings herein are incorporated into and constitute part of the description, illustrating the embodiments conforming to the present application, and are used together with the description to interpret the principles of the present application.

DESCRIPTION OF REFERENCE SIGNS

100, box body;

110, avoidance opening; 120, avoidance slot; 130, housing; 140, liner; 150, tool placement site;

160, screwdriver bit placement site;

131, first housing wall; 132, identification layer; 133, second clamping portion;

141, sliding member;

161, elongated mounting hole; 162, clamping structure; 163, limit plate; 164, stop block; 165, stop protrusion;

1611, third end; 1612, fourth end;

1621, clamping block; 1622, clamping projection;

200, cover body;

210, magnetic sheet; 220, arc-shaped curled edge; 230, arc-shaped space;

300, guide plate;

310, guide sliding groove; 320, first extension; 330, second extension;

311, first end; 312, second end; 313, clamping protrusion; 314, locking space;

331, first clamping portion; and

400, screwdriver bit.

By the above drawings, specific embodiments of the present application have been shown and will hereinafter be described in more detail. These drawings and written descriptions are not intended to limit the scope of the concept of the present application in any way, but rather to illustrate the concept of the present application by reference to specific embodiments for those skilled in the art.

DETAILED DESCRIPTION OF THE INVENTION

The technical solutions in the embodiments of the present application will be clearly and completely described below in conjunction with the accompanying drawings in the embodiments of the present application. Obviously, the described embodiments are only a part of the embodiments of the present application, rather than all of the embodiments. Based on the embodiments in the present application, all other embodiments obtained by those of ordinary skill in the art without inventive step belong to the scope of protection of the present application.

Figure 1:
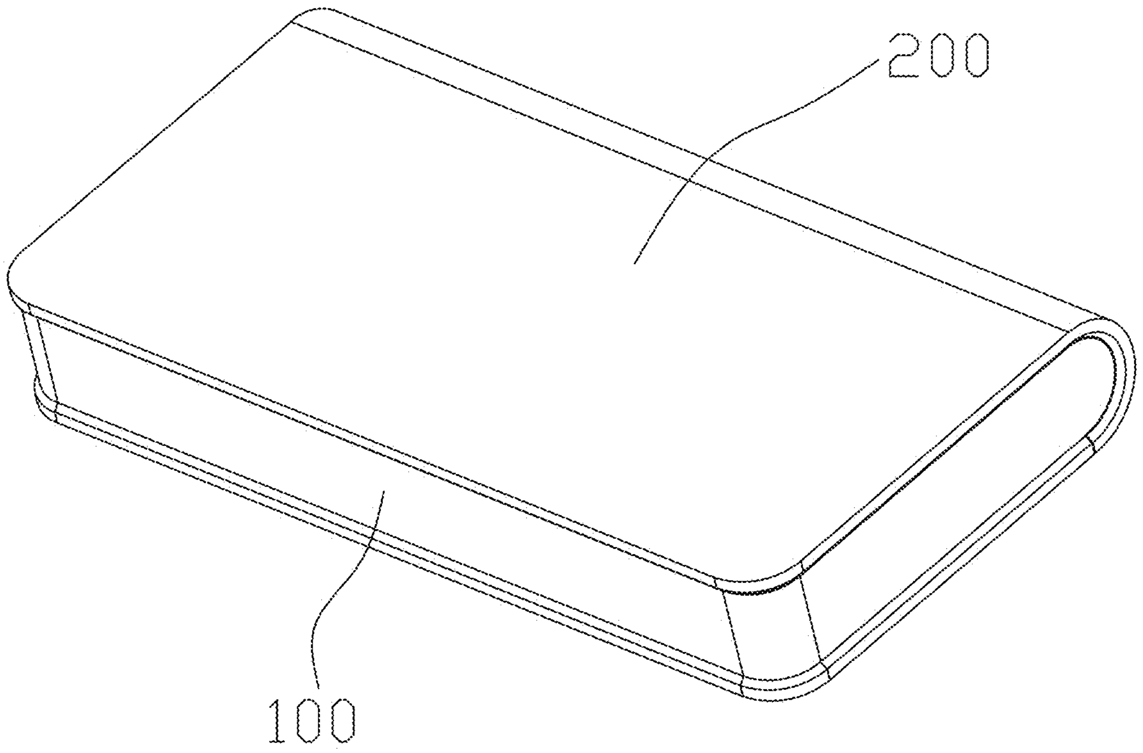
FIG. 1 is a schematic diagram of a tool box according to an embodiment of the present application in a closed state.
Figure 2:
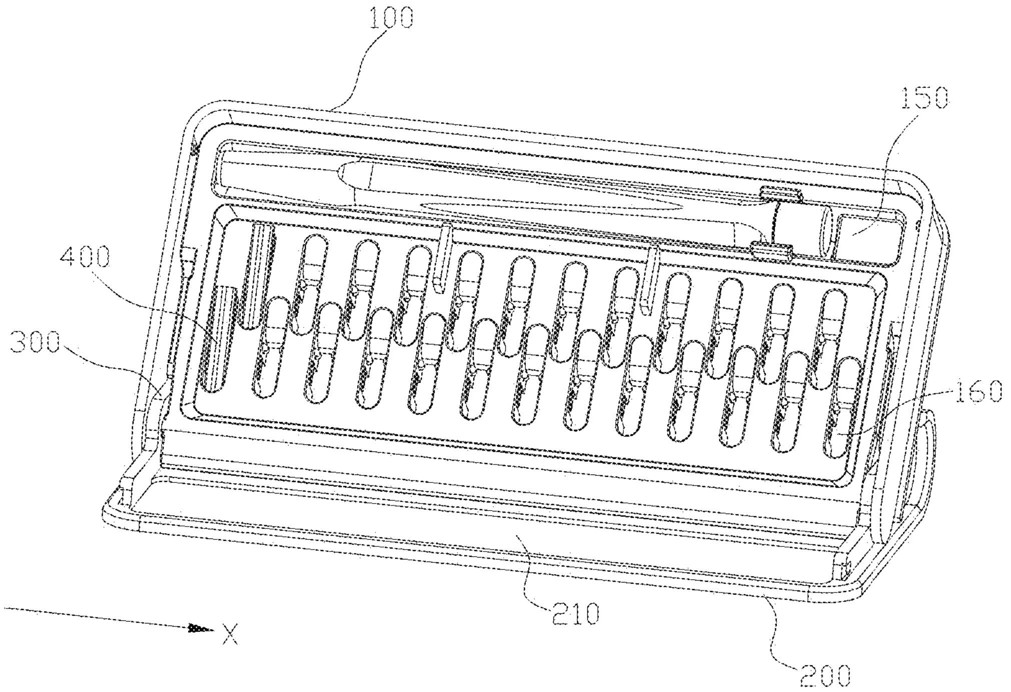
FIG. 2 is a schematic diagram of the tool box according to the embodiment of the present application in an open state in use.

As shown in FIGS. 1 and 2, a tool box provided in this embodiment includes a box body 100, a cover body 200 and a limiting structure. The cover body 200 is slidably connected to the box body 100, and the cover body 200 can rotate relative to the box body 100 at least at a sliding end of the cover body 200. That is, the cover body 200 and the box body 100 are slidably connected, the cover body 200 can rotate relative to the box body 100 at least at a sliding end where the cover body 200 slides relative to the box body 100, the cover body 200 can rotate relative to the box body 100 at the sliding end, and the cover body 200 may or may not be capable of rotating relative to the box body 100 at other positions of sliding, as long as the cover body 200 can rotate relative to the box body 100 at the sliding end.

The tool box has a closed state and an open state in use, the cover body 200 covers the box body 100 when the tool box is in the closed state; and when the tool box is used in the open state, the cover body 200 slides to the sliding end and is turned over to a position where the limiting structure limits the box body 100 and the cover body 200 such that the box body 100 is erected at a certain angle relative to the cover body 200. That is, in the open state of use of the tool box, the box body 100 is erected at a certain angle relative to the cover body 200, when the cover body 200 is placed on an operating platform, the box body 100 faces a user in an erected state, with respect to the box body 100 placed flat on the table top in the related art, it is more convenient for the user to clearly observe the tools placed in the box body 100, i.e., the display of the tools in the box body 100 is facilitated, and taking and placing of the tools is facilitated, so that the user can take and place the tools more conveniently, improving the user experience, and improving the function of the tool box.

It should be noted that in the present application, the movement of the cover body 200 and the box body 100 is relative, that is, the cover body 200 can slide relative to the box body 100, likewise, the box body 100 can also slide relative to the cover body 200, when the user opens the tool box, the user can push the cover body 200 to slide, the cover body 200 is turned over to open the tool box, and the user can also push the box body 100 to slide, the box body 100 is turned over to open the tool box, the cover body 200 slides to the sliding end, and is turned over to the position where the limiting structure limits the box body 100 and the cover body 200, which means that taking the box body 100 as a reference, the cover body 200 moves relative to the box body 100, and is turned over. Furthermore, the cover body 200 slides to the sliding end, and is turned over to the position where the limiting structure limits the box body 100 and the cover body 200, the two processes do not distinguish the sequence, and in the present application, the cover body 200 can slide to the sliding end and is then turned over to the position where the limiting structure limits the box body 100 and the cover body 200, and the cover body 200 can also slide to any position where the cover body 200 can be turned over with respect to the box body 100, and the cover body 200 is turned over first, and then slides to the sliding end.

In some embodiments of the present application, both sides of the tool box in a first direction (e.g., an X direction in FIG. 2) are each provided with a sliding fit mechanism, the sliding fit mechanism includes a first sliding portion and a second sliding portion, the first sliding portion is disposed on the box body 100, the second sliding portion is disposed on the cover body 200, and the first sliding portion and the second sliding portion are slidably connected.

Figure 3:
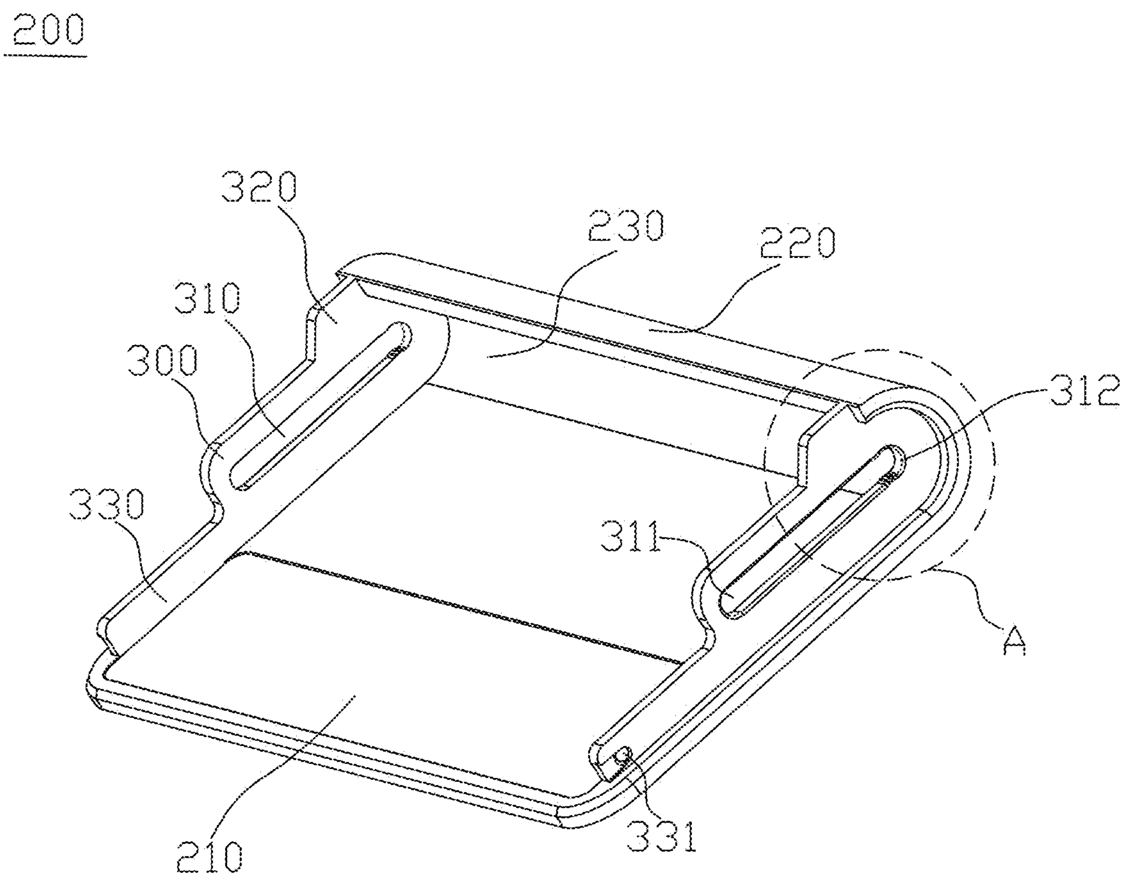
FIG. 3 is a schematic diagram of a cover body of the tool box according to the embodiment of the present application.
Figure 4:
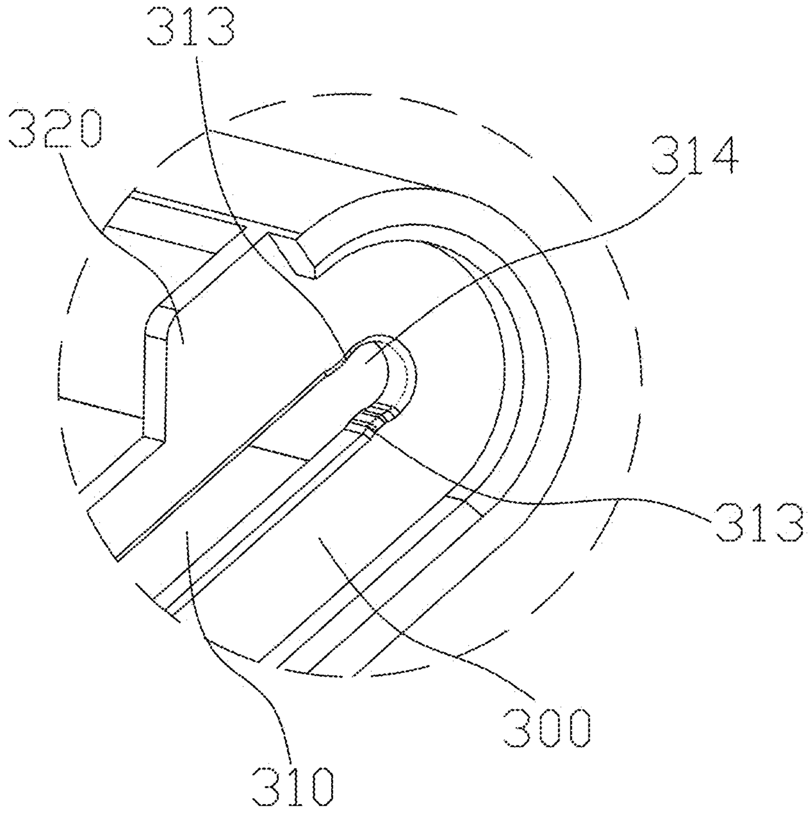
FIG. 4 is an enlarged view at A in FIG. 3.
Figure 5:
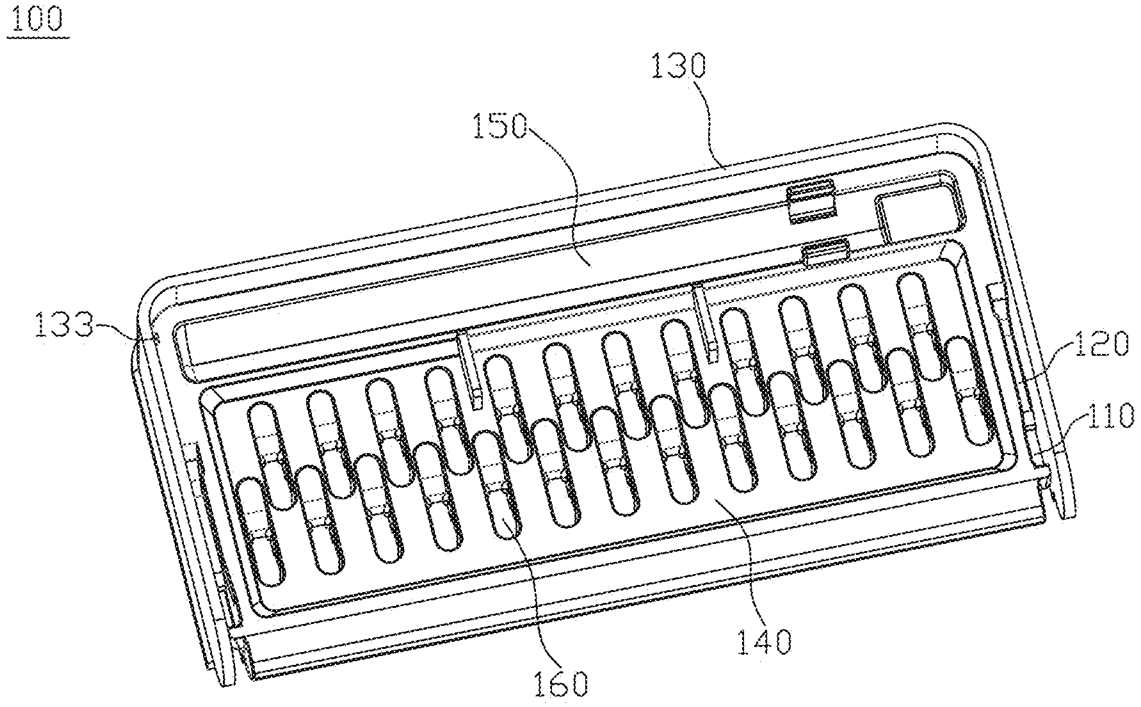
FIG. 5 is a schematic diagram of a box body of the tool box according to the embodiment of the present application.

Exemplarily, as shown in FIGS. 3, 4 and 5, each first sliding portion is a guide plate 300 disposed on the cover body 200, and the guide plate 300 is provided with a guide sliding groove 310. Each second sliding portion is a sliding member 141 disposed on the box body 100, and each sliding member 141 extends into the corresponding guide sliding groove 310 and can slide in the corresponding guide sliding groove 310. Exemplarily, each sliding member 141 is a sliding column. In this embodiment, each sliding member 141 can slide in the corresponding guide sliding groove 310, i.e., the box body 100 is pushed so that the box body 100 slides with respect to the cover body 200, and in addition, the sliding members 141 can limit a sliding direction of the cover body 200, i.e., the cover body 200 is pushed so that the cover body 200 slides along a length direction of the guide sliding groove 310.

As shown in FIG. 3, each guide sliding groove 310 is provided with a first end 311 and a second end 312 in an extending direction thereof, and the second end 312 is the sliding end of the cover body 200. The limiting structure includes first limiting structures and second limiting structures, each first limiting structure is an edge of the second end 312 of the corresponding guide sliding groove 310, and each second limiting structure is a first extension 320 extending to a side facing away from the cover body 200 in a region, close to the first end 311, of the corresponding guide plate 300. In the open state of use of the tool box, the first limiting structures abut against the sliding members 141 and the second limiting structures abut against the box body 100. That is, in the open state of use of the tool box, the first limiting structures limit the positions of the sliding members 141, and prevent the sliding members 141 from continuing to move away from the first ends 311, the second limiting structures prevent the box body 100 from continuing to turned over downward, the first limiting structures and the second limiting structures cooperate, limiting the position of the box body 100, so that the positions of the box body 100 and the cover body 200 remain unchanged, and the box body 100 is erected at a certain angle with respect to the cover body 200, for example, an angle between a side, provided with a tool placement site 150, of the box body 100 and the cover body 200 is 90-150°, that is, the angle between the side, provided with the tool placement site 150, of the box body 100 and the cover body 200 located on a front side of the side, provided with the tool placement site 150, of the box body 100 is 90-150°, that is, the side, provided with the tool placement site 150, of the box body 100 is inclined rearward with respect to the cover body 200, a side where the user is located is used as a front side when the user looks at the side of the tool placement site 150, so that the user can clearly observe each tool in the tool box at a glance. The tool box is provided with two limiting structures to limit the front and rear of the tool box, so that the tool box can neither slide forward nor be turned over backward, and the position of the box body 100 is defined in a state of being erected at a certain angle with respect to the cover body 200.

As shown in FIG. 5, the box body 100 is provided with avoidance openings 110 and avoidance slots 120 which communicate with each other, each sliding member 141 is disposed on a side wall of the corresponding avoidance opening 110, and each guide plate 300 is located in the corresponding avoidance opening 110 and the corresponding avoidance slot 120 when the tool box is in the closed state; in the open state of use of the tool box, each guide plate 300 is withdrawn from the corresponding avoidance opening 110 and the corresponding avoidance slot 120 to a position where the first limiting structure abuts against the sliding member 141, and the cover body 200 is turned over to a position where the second limiting structure abuts against an outer side of a bottom wall of the avoidance slot 120. That is, in the closed state of the tool box, each avoidance slot 120 gives way to the corresponding guide plate 300, each avoidance opening 110 gives way to the corresponding guide plate 300 and the corresponding first extension 320, and in the open state of use of the tool box, each avoidance opening 110 gives way to the corresponding guide plate 300, so that the cover body 200 can be turned over to a position where the second limiting structure abuts against the outer side of the bottom wall of the avoidance slot 120. Each second limiting structure is disposed in a region, close to the first end 311, of the corresponding guide plate 300, which enables the box body 100 to be inclined rearward in the open state in use to facilitate observation and taking and placing of the tools by the user.

It should be noted that the bottom wall of each avoidance slot 120 refers to a wall opposite to an opening of the avoidance slot 120, and the outer side of the bottom wall of the avoidance slot 120 refers to a side, facing away from the avoidance slot 120, of a portion, where the bottom wall of the avoidance slot 120 is formed, of the box body 100.

In an embodiment, the box body 100 may be of an integral structure, and the tool placement site 150 is disposed in the box body 100. The box body 100 may also include a housing 130 and a liner 140, the liner 140 is disposed within the housing 130, the tool placement site 150 is disposed within the liner 140, and the liner 140 is disposed within the box body 100 in a manner such that the same box body 100 can be provided with different internal storages to enable the tool box to store different types of tools.

Figure 6:
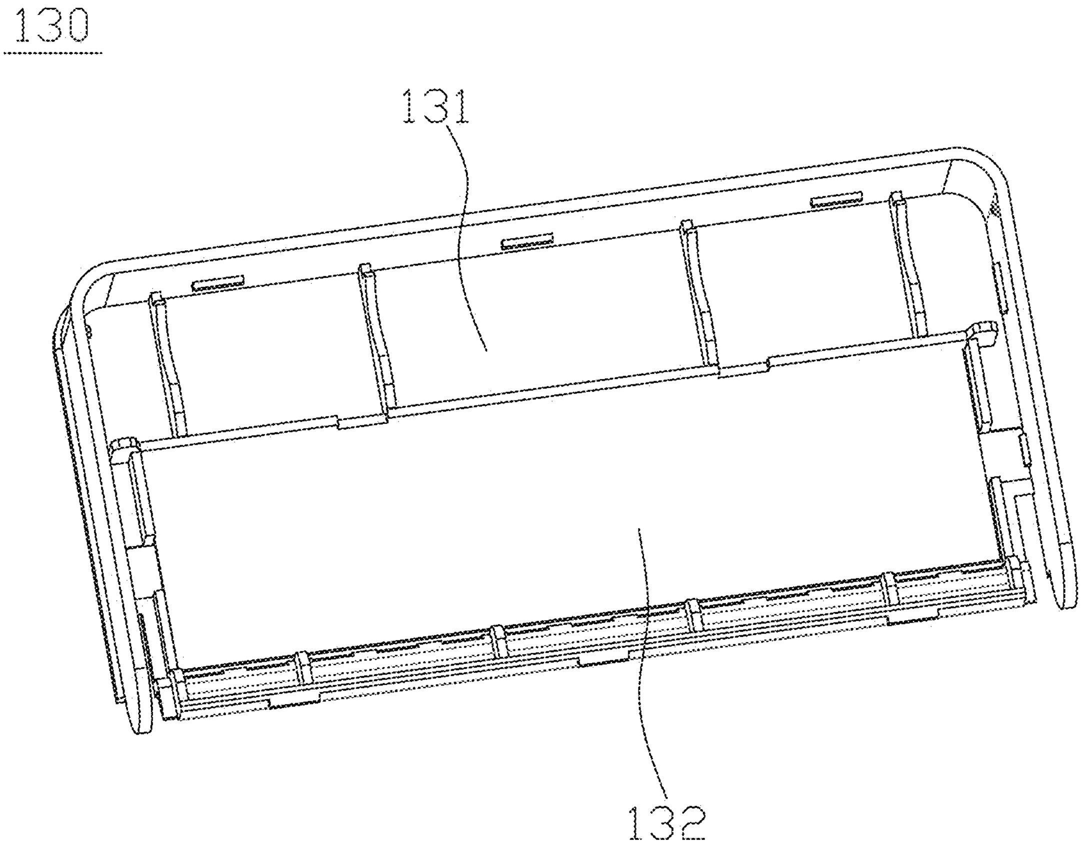
FIG. 6 is a schematic diagram of a housing of the tool box according to the embodiment of the present application.

In an embodiment, as shown in FIGS. 4, 5, and 6, the box body 100 includes a housing 130 and a liner 140 provided with a tool placement site 150 where a tool is placed. Illustratively, the tool placement site 150 may include, but is not limited to, a screwdriver bit placement site 160, a screwdriver handle placement site, a pry bar placement site, a forceps placement site, and the like. The avoidance openings 110 and the avoidance slots 120 are formed between the housing 130 and the liner 140, and the sliding members 141 are disposed on the liner 140. That is, an opening corresponding to each avoidance opening 110 is formed in the housing 130, when the liner 140 is mounted on the housing 130, at the positions, where the avoidance openings 110 and the avoidance slots 120 are formed, of the box body 100, the avoidance openings 110 and the avoidance slots 120 are oppositely formed in the side wall of the liner 140 and the side wall of the housing 130. That is, when the liner 140 is mounted on the housing 130, the liner 140 cooperates with the housing 130 to form the avoidance openings 110 and the avoidance slots 120. This arrangement reduces the difficulty and cost of manufacturing the box body 100. In addition, the sliding members 141 are disposed on the liner 140, that is, each sliding member 141 is disposed on a side wall, away from an edge of the box body 100, of the corresponding avoidance opening 110. This arrangement makes the structure of the box body 100 more stable, reduces the occurrence of breakage of the sliding members 141 during sliding, and increases the service life of the tool box.

In order to reduce shaking of the cover body 200 during sliding and to reduce the occurrence of the sliding members 141 getting stuck in the guide sliding grooves 310, in some embodiments of the present application, as shown in FIG. 3, each guide plate 300 extends in a direction of extension of the corresponding guide sliding groove 310 to a direction away from the second end 312 of the guide sliding groove 310 to form a second extension 330, and the liner 140 is lined in the housing 130. The second extensions 330 extend into the housing 130 when the tool box is in the closed state. When the tool box is turned from the open state in use to the closed state, first, the cover body 200 is turned over to a position opposite to a side, provided with the tool placement site 150, of the liner 140. At this time, the second extensions 330 extend into the housing 130. The second extensions 330 limit the position of the cover body 200 to reduce the shaking of the cover body 200 in the first direction (the X direction in FIG. 2), so that the cover body 200 can smoothly slide along in the direction of extension of the guide sliding grooves 310 to cover the box body 100.

Exemplarily, as shown in FIG. 3, in order to prevent the tool box from being opened at will in the closed state, each second extension 330 is provided with a first clamping portion 331, and a side wall, opposite to each second extension 330, of the housing 130 is provided with a second clamping portion 133. When the tool box is in the closed state, the first clamping portions 331 and the second clamping portions 133 are used for clamping, thereby clamping the cover body 200 to the box body 100, so that the tool box is not freely opened in the closed state. Illustratively, each first clamping portion 331 is a clamping slot and each second clamping portion 133 is a protrusion matched with the corresponding clamping slot.

In some embodiments of the present application, the tool box further includes first latching structures that latch the box body 100 and the cover body 200 together when the tool box is in the closed state. The first latching structures cooperate with the first clamping portions 331 and the second clamping portions 133 so that the tool box can be locked more firmly in the closed state and cannot easily be slid open, so that the tool box does not open itself during transport in a tool bag.

Illustratively, as shown in FIGS. 3 and 4, at least one of two opposing side walls, close to the first end 311, of each guide sliding groove 310 is provided with a clamping protrusion 313 protruding into the guide sliding groove 310. The clamping protrusions 313 are the first latching structures, and the clamping protrusions 313 block the sliding members 141 from sliding over. A portion of each guide sliding groove 310 between the corresponding clamping protrusion 313 and an end of the first end 311 of the guide sliding groove 310 is a locking space 314 that accommodates the corresponding sliding member 141. When each clamping protrusion 313 abuts against the corresponding sliding member 141, the box body 100 and/or the cover body 200 are/is pushed with a force, and the sliding member 141 slides over the clamping protrusion 313 and into the corresponding locking space 314. That is, when the clamping protrusion 313 is disposed on one side wall of the guide sliding groove 310, a contraction space is formed between the clamping protrusion 313 and a side wall, not provided with the clamping protrusion 313, of the guide sliding groove 310, and the sliding member 141 slides through the contraction space into the locking space 314 by deformation of the side wall of the guide sliding groove 310. When the sliding members 141 are not subjected to an external force, the sliding members 141 are blocked by the clamping protrusions 313 and are limited in the corresponding locking spaces 314. Also, when the two opposite side walls of the guide sliding groove 310 are each provided with the clamping protrusion 313, a contraction space is formed between two clamping protrusions 313, and the two clamping protrusions 313 limit the position of the corresponding sliding member 141 so that when the sliding members 141 are not subjected to an external force, the sliding members 141 are blocked by the clamping protrusions 313 and are limited in the corresponding locking spaces 314. That is, in an embodiment of the present application, at a front side of the tool box in the extending direction of the guide sliding grooves 310, the first clamping portions 331 and the second clamping portions 133 cooperate with each other for clamping, at a rear side of the tool box in the extending direction of the guide sliding grooves 310, the positions of the sliding members 141 are limited by the clamping protrusions 313, so that the tool box can be locked more firmly in the closed state and cannot be easily slid open, so that the tool box does not open itself during transport in the tool bag.

In some embodiments of the present application, as shown in FIG. 2, the box body 100 is provided with a tool placement site 150 where a tool is placed, and an angle between a side, provided with the tool placement site 150, of the box body 100 and the cover body 200 is 90-150° when the tool box is used in the open state. Illustratively, the angle between the side, provided with the tool placement site 150, of the box body 100 and the cover body 200 is 90°, 100°, 110°, 120°, 135°, 150°, or the like. The angle between the side, provided with the tool placement site 150, of the box body 100 and the cover body 200 is an angle between the side, provided with the tool placement site 150, of the box body 100 and the cover body 200 located on a front side of the side, provided with the tool placement site 150, of the box body 100. This arrangement enables the side, provided with the tool placement site 150, of the box body 100 to be inclined rearward with respect to the cover body 200, and a side where the user is located is used as a front side when the user looks at the side of the tool placement site 150, so that the user can clearly observe each tool in the tool box at a glance.

Figure 7:
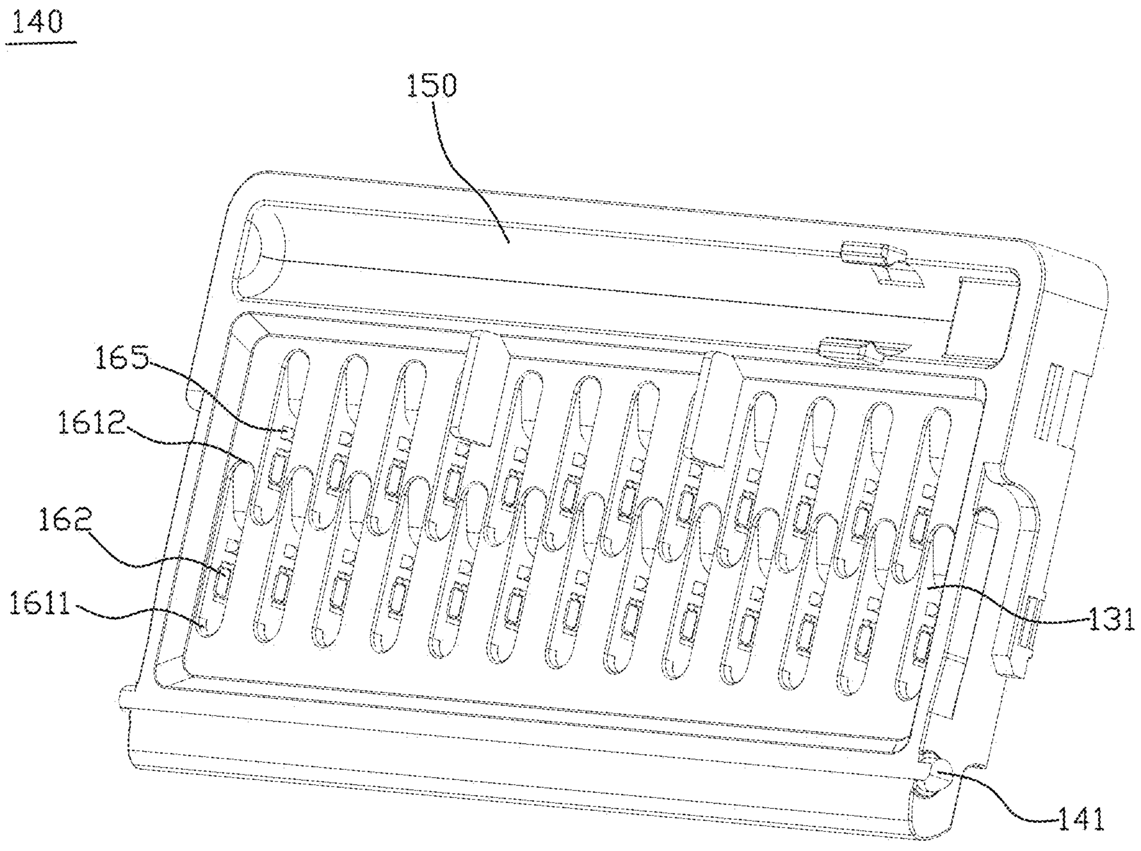
FIG. 7 is a schematic front view of a liner of the tool box according to the embodiment of the present application.

In some embodiments of the present application, as shown in FIGS. 2, 5, and 7, the tool placement site 150 includes a plurality of screwdriver bit placement sites 160 for storing screwdriver bits 400. The housing 130 is provided with an opening and a first housing wall 131 opposite to the opening, and a receiving space is formed between a side, facing the first housing wall 131, of the liner 140 and the first housing wall 131. Each screwdriver bit placement site 160 includes an elongated mounting hole 161 disposed in the liner 140 and a clamping structure 162 disposed at an edge of the elongated mounting hole 161, the screwdriver bit placement site 160 is configured to allow a tail end of a screwdriver bit 400 to be inserted into a third end 1611 of the elongated mounting hole 161 and extend into the receiving space when the screwdriver bit is stored, and the screwdriver bit 400 is rotated toward a fourth end 1612 of the elongated mounting hole 161 until the clamping structure 162 clamps the screwdriver bit 400, and the tail end of the screwdriver bit 400 abuts against an edge of the third end 1611 of the elongated mounting hole 161. The third end 1611 and the fourth end 1612 of the elongated mounting hole 161 are both ends of the elongated mounting hole 161 in an extending direction. That is, the edge of the third end 1611 of the elongated mounting hole 161 limits the position of the tail end of the screwdriver bit 400 so that the tail end of the screwdriver bit 400 does not rotate excessively.

In this embodiment, a head of the screwdriver bit 400 is slotted, Phillips, Pozidriv, Torx, square, hexagonal, Y-shaped, or the like, and a tail of the screwdriver bit 400 is generally a hexagonal head, and of course, both ends of the screwdriver bit 400 may be slotted, Phillips, Pozidriv, Torx, square, hexagonal, Y-shaped, or the like. When the head of the screwdriver bit 400 is slotted, Phillips, Pozidriv, Torx, square, hexagonal, Y-shaped, or the like, the tail of the screwdriver bit 400 is inserted into the third end 1611 of the elongated mounting hole 161 so that the head of the screwdriver bit 400 is exposed for identification by a user, and either end of the screwdriver bit 400 can be inserted into the third end 1611 of the elongated mounting hole 161 when both ends of the screwdriver bit 400 are slotted, Phillips, Pozidriv, Torx, square, hexagonal, Y-shaped, or the like. In this embodiment, the exposed head of the screwdriver bit 400 in FIG. 2 is not shown in its particular shape, such as slotted, Phillips, Pozidriv, Torx, square, hexagonal, Y-shaped, and the like.

In some embodiments of the present application, the elongated mounting holes 161 extend in a direction in which the box body 100 is erected with respect to the cover body 200. This arrangement makes it more convenient for a user to take a tool.

Figure 8:
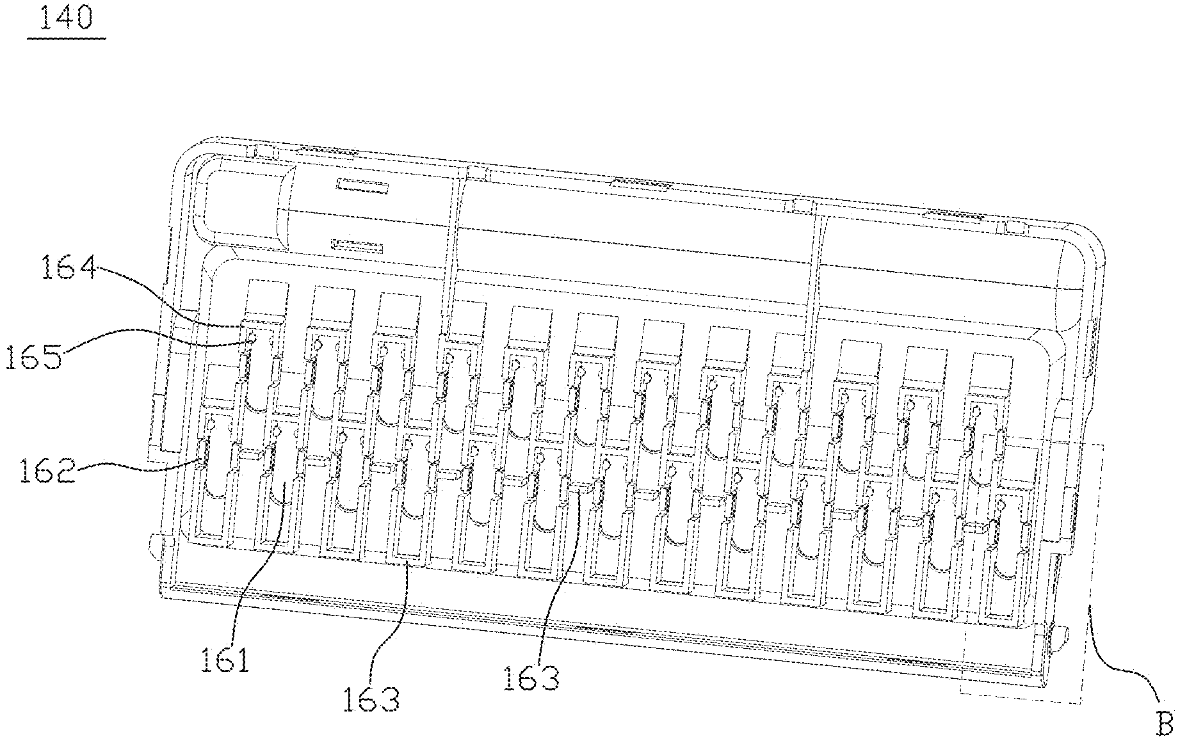
FIG. 8 is a schematic rear view of the liner of the tool box according to the embodiment of the present application.
Figure 9:
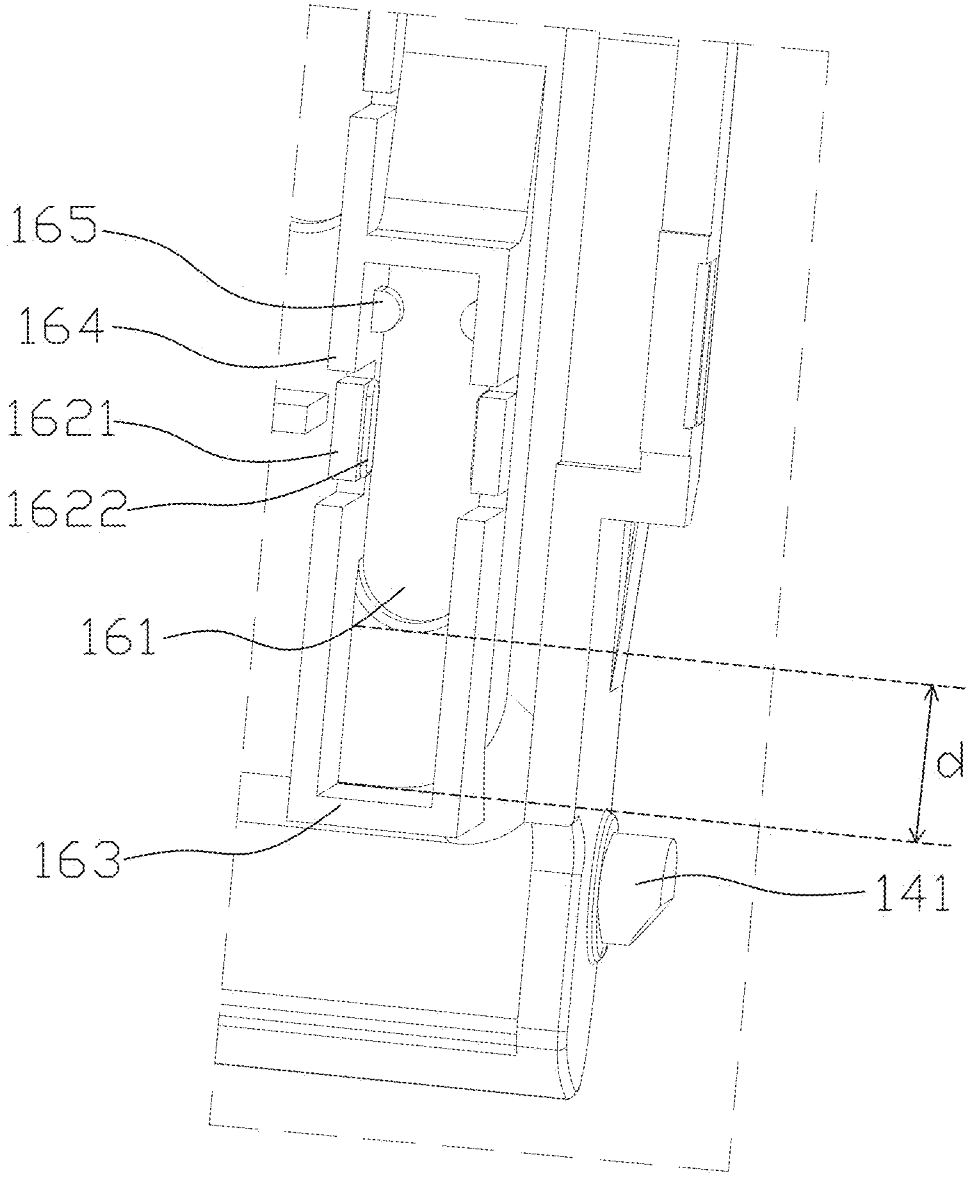
FIG. 9 is an enlarged view at B in FIG. 8.

As shown in FIGS. 7, 8 and 9, each clamping structure 162 includes two clamping blocks 1621, the two clamping blocks 1621 are oppositely disposed, wherein one of the clamping blocks 1621 is disposed on a first side of the corresponding elongated mounting hole 161, the other clamping block 1621 is disposed on a second side of the elongated mounting hole 161, i.e., the two clamping blocks 1621 are disposed on both opposite sides of the elongated mounting hole 161, each clamping block 1621 is provided with a clamping projection 1622, the two clamping projections 1622 are oppositely arranged, and a first contraction space is formed between the two clamping projections 1622, and the screwdriver bit 400 is clamped between the two clamping projections 1622 in an interference fit manner. That is, when the screwdriver bit 400 is stored in the screwdriver bit placement site 160, two clamping projections 1622 clamp the screwdriver bit 400, so that the position of the screwdriver bit 400 is relatively fixed, the tail end of the screwdriver bit 400 is inserted into the third end 1611 of the elongated mounting hole 161, and extends into the receiving space. The edge of the third end 1611 of the elongated mounting hole 161 limits a position of the screwdriver bit 400 and is matched with the two clamping projections 1622 to clamp the screwdriver bit 400 so that the screwdriver bit 400 can be stored relatively securely on the screwdriver bit placement site 160. When the tool box is dropped, the screwdriver bit 400 stored on the screwdriver bit placement site 160 can be placed relatively securely on the screwdriver bit placement site 160 without being easily dropped out.

In some embodiments of the present application, as shown in FIGS. 8 and 9, each screwdriver bit placement site 160 further includes a limit plate 163 for limiting excessive insertion of a tail end of the screwdriver bit 400, the limit plate 163 being disposed on a side, facing the first housing wall 131, of the liner 140 and on a side, facing away from the fourth end 1612, of the elongated mounting hole 161, the limit plate 163 having a clearance distance d from an edge of the third end 1611 of the elongated mounting hole 161. The setting of the limit plates 163 can avoid excessive insertion when the screwdriver bits 400 are inserted into the third ends 1611 of the elongated mounting holes 161, resulting in uneven insertion length of the screwdriver bits 400, uneven exposed length of the screwdriver bits 400, and uneven placement of the screwdriver bits 400, and can also avoid excessive insertion of some shorter screwdriver bits 400, resulting in dropping of the screwdriver bits 400 into the receiving space.

In order to make an inclination angle of the screwdriver bits 400 uniform when the screwdriver bits 400 are installed on the screwdriver bit placement sites 160, in some embodiments of the present application, each screwdriver bit placement site 160 further includes two stop blocks 164, the two stop blocks 164 being oppositely disposed, one of the stop blocks 164 being disposed on a first side of the elongated mounting hole 161 and the other stop block 164 being disposed on a second side of the elongated mounting hole 161, each stop block 164 is provided with a stop protrusion 165, the two stop protrusions 165 are oppositely arranged, and a spacing between the two stop protrusions 165 is smaller than a radial dimension of the screwdriver bit 400. When the screwdriver bit 400 is clamped at the clamping structure 162, the two stop protrusions 165 abut against the screwdriver bit 400 and block further rotation of the screwdriver bit 400. That is, the two stop protrusions 165 are matched with the edge of the third end 1611 of the elongated mounting hole 161, so that the angles of inclination of the screwdriver bits 400 at the screwdriver bit placement sites 160 are the same, so that the screwdriver bits 400 are more beautifully displayed in the tool box after installed.

In some embodiments of the present application, as shown in FIG. 6, the first housing wall 131 is provided with an identification layer 132, a color of the identification layer 132 being different from a color of the liner 140 and a color of the housing 130. The setting of the identification layer 132 enables the user to see at a glance which screwdriver bit placement site 160 is not provided with the screwdriver bit 400. This arrangement enables the user to quickly check whether the screwdriver bit 400 is lost after using the tool box, thereby reducing the possibility of loss of the screwdriver bit 400. In addition, the setting of the identification layer 132 can also remind the user which screwdriver bit placement site 160 is still vacant, and the user can quickly put the screwdriver bit 400 back after using the screwdriver bit 400, thereby saving the time for the user to find the vacant screwdriver bit placement site 160 when the screwdriver bit 400 is placed, improving the user experience.

As shown in FIG. 2 and FIG. 3, in order to increase the function of the tool box and make reasonable use of the space of the tool box, the cover body 200 is provided with a magnetic sheet 210 placement position, and the magnetic sheet 210 placement position is fixedly provided with a magnetic sheet 210, and the magnetic sheet 210 is located on a front side of the side, provided with the tool placement site 150, of the box body 100. The magnetic sheet 210 can adsorb the screwdriver bits 400, screws, and the like. The user normally uses the screwdriver bit 400 to disassemble and assemble screws. The magnetic sheet 210 provides a temporary placement position of the screws and the screwdriver bits 400 for the user, avoiding the disorderly placement of the screws and the screwdriver bits 400 during the user's work, which leads to time-consuming search when the user uses the screws and the screwdriver bits 400, or causes the screws and the screwdriver bits 400 to be lost.

In some embodiments of the present application, as shown in FIG. 3, one end of the cover body 200 in a sliding direction is folded to one side to form an arc-shaped curled edge 220, an arc-shaped space 230 is formed in the arc-shaped curled edge 220, and an end of the box body 100 in a sliding direction of the cover body 200 is a curved surface structure, and the curved surface structure moves into the arc-shaped space 230 when the tool box is in the closed state. The curved surface structure gives way to the rotation of the cover body 200, and the curved surface structure moves into the arc-shaped space 230 when the tool box is in the closed state, increasing the aesthetic appearance of the box body 100.

Other embodiments of the present application will be readily conceived by those skilled in the art after taking into account the description and practicing the present application disclosed herein. The present application is intended to cover any variations, uses or adaptive variations of the present application, and the variations, uses or adaptive variations follow the general principles of the present application and include the common general knowledge or conventional technical means in the art, which is not disclosed in the present application. The description and the embodiments are considered only exemplary, and the true scope and spirit of the present application are indicated by the following claims.

It should be understood that the present application is not limited to the precise structures that have been described above and shown in the drawings, and that various modifications and changes can be made without departing from the scope of the present application. The scope of the present application is limited only by the appended claims.

The invention claimed is:

1. A tool box, comprising a box body, a cover body and a limiting structure, wherein the cover body is slidably connected to the box body, and can rotate relative to the box body at least at a sliding end of the cover body;

the cover body covers the box body when the tool box is in a closed state; and when the tool box is used in an open state, the cover body slides to the sliding end and is turned over to a position where the limiting structure limits the box body and the cover body such that the box body is erected at a certain angle relative to the cover body;

wherein the box body is provided with a tool placement site where a tool is placed; and when the tool box is used in the open state, an angle between a side, provided with the tool placement site, of the box body and the cover body is 90-150°;

the box body comprises a housing and a liner, the liner is mounted within the housing, the tool placement site is disposed on the liner, and the tool placement site comprises a plurality of screwdriver bit placement sites;

the housing is provided with an opening and a first housing wall, the first housing wall being opposite to the opening;

a receiving space is formed between a side, facing the first housing wall, of the liner and the first housing wall; and each screwdriver bit placement site comprises an elongated mounting hole disposed in the liner and a clamping structure disposed at an edge of the elongated mounting hole, the screwdriver bit placement site is configured to allow a tail end of a screwdriver bit to be inserted into a first end of the elongated mounting hole, and extend into the receiving space when the screwdriver bit is stored, the screwdriver bit is rotated toward a second end of the elongated mounting hole until the clamping structure clamps the screwdriver bit, and the tail end of the screwdriver bit abuts against an edge of the first end of the elongated mounting hole, the first end and the second end of the elongated mounting hole being both ends of the elongated mounting hole in an extending direction.

2. The tool box according to claim 1, wherein both sides of the tool box in a first direction are each provided with a sliding fit mechanism; and each sliding fit mechanism comprises a first sliding portion and a second sliding portion, the first sliding portion is disposed on the box body, the second sliding portion is disposed on the cover body, and the first sliding portion and the second sliding portion are slidably connected.

3. The tool box according to claim 2, wherein each first sliding portion is a guide plate disposed on the cover body, and the guide plate is provided with a guide sliding groove; and each second sliding portion is a sliding member disposed on the box body, and each sliding member extends into the corresponding guide sliding groove and can slide in the corresponding guide sliding groove.

4. The tool box according to claim 3, wherein each guide sliding groove is provided with a first end and a second end in an extending direction thereof, the second end being the sliding end of the cover body;

the limiting structure comprises first limiting structures and second limiting structures, each first limiting structure is an edge of the second end of the corresponding guide sliding groove, and each second limiting structure is a first extension extending to a side facing away from the cover body in a region, close to the first end, of the corresponding guide plate; and each first limiting structure abuts against the corresponding sliding member and the second limiting structures abut against the box body when the tool box is used in the open state.

5. The tool box according to claim 4, wherein the box body is provided with avoidance openings and avoidance slots which communicate with each other;

each sliding member is disposed on a side wall of the corresponding avoidance opening; and each guide plate is located in the corresponding avoidance opening and the corresponding avoidance slot when the tool box is in the closed state; when the tool box is used in the open state, each guide plate is withdrawn from the corresponding avoidance opening and the corresponding avoidance slot to a position where the first limiting structure abuts against the sliding member, and the cover body is turned over to a position where the second limiting structure abuts against an outer side of a bottom wall of the avoidance slot.

6. The tool box according to claim 5, wherein the box body comprises a housing and a liner, the liner being mounted within the housing, the liner being provided with a tool placement site where a tool is placed;

the avoidance openings and the avoidance slots are formed between the housing and the liner; and the sliding members are disposed on the liner.

7. The tool box according to claim 6, wherein each guide plate extends in the extending direction of the corresponding guide sliding groove to a direction away from the second end of the corresponding guide sliding groove, forming a second extension;

the liner is lined within the housing; and the second extensions extend into the housing when the tool box is in the closed state.

8. The tool box according to claim 7, wherein each second extension is provided with a first clamping portion;

a side wall, opposite to each second extension, of the housing is provided with a second clamping portion; and the first clamping portions and the second clamping portions are used for clamping when the tool box is in the closed state.

9. The tool box according to claim 4, further comprising first latching structures that latch the box body and the cover body together when the tool box is in the closed state.

10. The tool box according to claim 9, wherein at least one of two opposite side walls, close to the first end, of each guide sliding groove is provided with a clamping protrusion protruding into the guide sliding groove, the clamping protrusions being the first latching structures, the clamping protrusions blocking the sliding members from sliding over;

a portion of each guide sliding groove between the corresponding clamping protrusion and an end of the first end of the guide sliding groove is a locking space that accommodates the corresponding sliding member; and when each clamping protrusion abuts against the corresponding sliding member, the box body and/or the cover body are/is pushed with a force, and the sliding member slides over the clamping protrusion and into the corresponding locking space.

11. The tool box according to claim 1, wherein each elongated mounting hole extends in a direction in which the box body is erected with respect to the cover body.

12. The tool box according to claim 1, wherein each clamping structure comprises two clamping blocks, the two clamping blocks being oppositely disposed, one of the clamping blocks being disposed on a first side of the corresponding elongated mounting hole and the other clamping block being disposed on a second side of the elongated mounting hole; and each clamping block is provided with a clamping projection, the two clamping projections are oppositely arranged, and a first contraction space is formed between the two clamping projections, and the screwdriver bit is clamped between the two clamping projections in an interference fit manner.

13. The tool box according to claim 1, wherein each screwdriver bit placement site further comprises a limit plate for limiting excessive insertion of a tail end of the screwdriver bit, the limit plate being disposed on a side, facing the first housing wall, of the liner and on a side, facing away from the second end, of the elongated mounting hole, the limit plate having a clearance distance from an edge of the first end of the elongated mounting hole.

14. The tool box according to claim 1, wherein each screwdriver bit placement site further comprises two stop blocks, the two stop blocks being oppositely disposed, one of the stop blocks being disposed on a first side of the elongated mounting hole and the other stop block being disposed on a second side of the elongated mounting hole; and each stop block is provided with a stop protrusion, the two stop protrusions are oppositely arranged, and a spacing between the two stop protrusions is smaller than a radial dimension of the screwdriver bit; and when the screwdriver bit is clamped at the clamping structure, the two stop protrusions abut against the screwdriver bit and block further rotation of the screwdriver bit.

15. The tool box according to claim 1, wherein the first housing wall is provided with an identification layer, a color of the identification layer being different from a color of the liner and a color of the housing.

16. The tool box according to claim 1, wherein the cover body is provided with a magnetic sheet placement position, the magnetic sheet placement position is fixedly provided with a magnetic sheet, and the magnetic sheet is located on a front side of the side, provided with the tool placement site, of the box body.

17. The tool box according to claim 1, wherein one end of the cover body in a sliding direction is folded to one side to form an arc-shaped curled edge, and an arc-shaped space is formed in the arc-shaped curled edge;

an end of the box body in a sliding direction of the cover body is a curved surface structure; and the curved surface structure moves into the arc-shaped space when the tool box is in the closed state.

* * * * *